(12) United States Patent
Butterfield et al.

(10) Patent No.: US 6,749,206 B1
(45) Date of Patent: Jun. 15, 2004

(54) CONTAINER FOR RECYCLABLE MATERIALS

(75) Inventors: Floyd S. Butterfield, 5996 Buena Vista Dr., Paso Robles, CA (US) 93446; Michael S. O'Keefe, Samamish, WA (US)

(73) Assignee: Floyd S. Butterfield, Paso Robles, CA (US)

( * ) Notice: Subject to any disclaimer, the term of this patent is extended or adjusted under 35 U.S.C. 154(b) by 8 days.

(21) Appl. No.: 10/101,997

(22) Filed: Mar. 20, 2002

Related U.S. Application Data

(60) Continuation-in-part of application No. 09/930,081, filed on Aug. 15, 2001, which is a division of application No. 09/083,740, filed on May 22, 1998, now Pat. No. 6,293,568.

(51) Int. Cl.[7] .............................. B62B 7/02; B62B 1/00
(52) U.S. Cl. ................................ 280/47.26; 280/79.11; 280/79.7
(58) Field of Search .......................... 280/79.11, 79.7, 280/33.995, 33.998, 40, 43.1, 47.13, 47.17, 47.26

(56) References Cited

U.S. PATENT DOCUMENTS

| | | | |
|---|---|---|---|
| 3,279,348 A | | 10/1966 | Kinnard |
| 3,445,150 A | | 5/1969 | Zartarian |
| 3,876,223 A | | 4/1975 | O'Reilly et al. |
| 4,043,485 A | | 8/1977 | Tippetts |
| 4,094,526 A | | 6/1978 | Clarke et al. |
| 4,217,985 A | | 8/1980 | Nasgowitz |
| 4,247,130 A | | 1/1981 | Paterson |
| 4,765,503 A | | 8/1988 | Otto et al. |
| D310,760 S | * | 9/1990 | Murphy ..................... D6/512 |
| 5,005,709 A | | 4/1991 | Stokes |
| 5,033,759 A | | 7/1991 | Wix |
| 5,088,750 A | | 2/1992 | Beese et al. |
| 5,096,368 A | | 3/1992 | Butterfield |
| 5,159,875 A | | 11/1992 | Cohen |
| D332,335 S | | 1/1993 | Casad |
| 5,181,460 A | | 1/1993 | Gremelsbacker |
| 5,244,220 A | | 9/1993 | Cortez |
| 5,261,562 A | * | 11/1993 | Prout et al. .................. 220/771 |
| 5,333,885 A | | 8/1994 | Pullman |
| 5,356,027 A | * | 10/1994 | Craft et al. .................. 220/840 |
| 5,378,005 A | | 1/1995 | Norton |
| 5,388,506 A | | 2/1995 | Vargas et al. |
| 5,394,997 A | | 3/1995 | Gollob |

(List continued on next page.)

FOREIGN PATENT DOCUMENTS

| | | |
|---|---|---|
| FR | 2692872 | 6/1992 |
| GB | 2247650 A | 3/1992 |

OTHER PUBLICATIONS

"You Can Trust OTTO To Protect Your Sensitive Documents", Otto Industries, Inc., MSD Cart Product Specifications, 1 page.

Primary Examiner—Paul N. Dickson
Assistant Examiner—Toan C To
(74) Attorney, Agent, or Firm—Christie, Parker & Hale, LLP

(57) ABSTRACT

A container for a pile of recyclable material includes bottom, side, and back walls and a substantially open front to facilitate inspecting the pile for contaminants. A pair of rotatable wheels on the bottom of the container, and a base on the bottom of the container are adapted to rest on a horizontal supporting surface such as a floor. A transparent retainer on the front of the container confines the pile of papers when the container is tilted and rolled from one location to another. The container bottom slopes downwardly away from the open front of the container, and the back of the container slopes upwardly away from the open front to promote forming a pile which is slightly inclined to vertical when the container rests on the horizontal surface. External means on the container facilitate picking up the container and dumping the pile in a collection truck.

25 Claims, 12 Drawing Sheets

U.S. PATENT DOCUMENTS

| | | |
|---|---|---|
| 5,415,514 A | 5/1995 | Butterfield |
| 5,445,397 A | 8/1995 | Evans |
| 5,458,350 A | 10/1995 | Johnson et al. |
| 5,480,187 A | 1/1996 | Binning |
| 5,542,551 A | 8/1996 | Smith |
| 5,671,933 A | 9/1997 | Tucker |
| 5,797,612 A | 8/1998 | Buccioni |
| 5,862,980 A | 1/1999 | Samuelson |
| 5,893,572 A | 4/1999 | Parks |
| 5,899,468 A | 5/1999 | Apps et al. |
| 6,098,818 A * | 8/2000 | Ali et al. ............ 211/50 |
| 6,145,856 A * | 11/2000 | Conti ............ 280/47.26 |
| 6,182,856 B1 * | 2/2001 | Berrenberg et al. ......... 220/771 |
| 6,293,568 B1 * | 9/2001 | Butterfield et al. .... 280/33.995 |
| 6,505,842 B2 * | 1/2003 | Butterfield et al. .... 280/33.995 |
| 6,550,793 B2 * | 4/2003 | Carter ............ 280/47.26 |

* cited by examiner

CONTAINER FOR RECYCLABLE MATERIALS

CROSS-REFERENCE TO RELATED APPLICATIONS

This is a continuation-in-part application of co-pending application Ser. No. 09/930,081 filed Aug. 15, 2001, which is a divisional application of application Ser. No. 09/083,740 filed May 22, 1998, now U.S. Pat. No. 6,293,568, the disclosures of which are incorporated herein by reference.

BACKGROUND OF THE INVENTION

1. Field of the Invention

This invention relates to containers for storing and transporting a pile of recyclable material such as paper, cans, bottles, and the like.

2. Description of the Related Art

For many years recyclable material, such as newspapers, cans, bottles, and the like have been collected and recycled to conserve resources, and reduce the amount of material incinerated or sent to landfills. However, much recyclable material is not recycled because it cannot be collected efficiently and economically. For example, various types of containers have been provided for the accumulation of recyclable articles. However, these containers have opaque walls, which conceal the contents. Consequently, many people who discard recyclable material often mix non-recyclable contaminants, such as waste food, grass clippings, and other trash, with recyclable material. In addition, certain types of recyclable material, say aluminum cans, are often contaminated by mixing with other types of recyclable materials, such as bottles, paper, or the like. Either type of contamination is often unacceptable in the business of recycling, and discourages collection of recyclable material because it makes handling of the accumulated material inordinately time-consuming and therefore uneconomical.

Because of the above shortcomings, a large amount of recyclable material is not recovered for recycling, but instead is sent to expensive landfills, or dumped into the ocean.

BRIEF SUMMARY OF THE INVENTION

This invention provides containers in which piles of relatively large amounts of recyclable articles can be compactly stored, and easily inspected by a collector of the articles to ascertain that the pile is not contaminated. If the pile is contaminated, the collector can refuse to accept it from the customer. If the pile contains only the articles wanted by the collector, the customer can be rewarded, say with a reduced collection fee, or cash payment. In either case, the customer is given an incentive to cooperate in making recycling successful. The containers of this invention also make it easy to move a collected pile of large amounts of recyclable material to a convenient location for rapid inspection and economical pickup by a recycler.

The preferred container of this invention is in the shape of an elongated upright box with a front, which is substantially open, and a bottom, two sides and a back, which are substantially closed. A pair of rotatable wheels are mounted on the lower end of the container, which has a base adapted to rest on a substantially horizontal supporting surface, such as a floor.

Preferably, the container of this invention is integrally molded from plastic. Since the front of the container is substantially open, some structural integrity is lost because of that construction. However, the preferred embodiment of this invention provides a container in which the side walls and a back wall are molded together with a floor at the bottom of the container to provide strength and rigidity, which permits the walls of the container to be relatively thin, thereby saving material and cost in manufacturing the container.

Briefly, the preferred container molded integrally from plastic includes a pair of upright substantially parallel side walls. Each side wall has a bottom edge, a forward edge and a rear edge. An upright back wall, disposed substantially perpendicular to the side walls, has a bottom edge, a first side edge formed integrally with a rear edge of one side wall, and a second side edge formed integrally with the rear edge of the other side wall. A separate inwardly extending substantially horizontal web is formed integrally with each bottom edge of the side and back walls. A separate upwardly extending flange is formed integrally with the inner edge of each web. A substantially horizontal floor has a rear edge formed integrally with an upper edge of the flange on the web of the rear wall, and a pair of side edges each formed integrally with a respective upper edge with a side wall flange on a web of a side wall. A separate inwardly extending retaining lip is formed integrally at an outer edge with the forward edge of each side wall. The horizontal width of each lip is substantially less than the horizontal distance between the side walls so that the front of the container is substantially open to permit rapid visual inspection of recyclable material in the container. A pair of wheels are secured to the lower portions of the side walls to be rotatable about a substantially horizontal axis so that when the wheels rest on a horizontal support the webs of the side walls can also rest on the support so that the container can be tilted to lift the container out of contact with the support and rolled on the wheels to move the container.

For added strength and rigidity, the floor of the container preferably includes a waffle-type pattern with alternating ridges and valleys. An outwardly extending flange formed integrally with the top edges of the side and back walls provide added rigidity and strength to the upper part of the container. Preferably, a separate, forwardly extending handle bracket is formed integrally with the upper portion of each retaining lip, and, an elongated horizontal handle is integrally molded with the forward portion of each bracket to provide rigidity and strength to the upper portion of the container, and also provide a convenient way for tilting and rolling the container.

Preferably the walls of the container slope slightly upwardly and away from each other so that before the wheels are attached to the container several containers can be nested together in a compact stack for shipping. Preferably the side and back walls of the container are each formed with an inwardly disposed, centrally located respective panel to form an external and downwardly opening groove on each wall to add strength and rigidity to the container, and to facilitate nesting of one container in another.

In one form of the invention the open front of the container is covered by a transparent retainer to confine recyclable material, and permit quick and easy inspection of the pile of recyclable material in the container to ascertain that the pile is not contaminated with unacceptable material. Once the container is full, it is easily tilted by the typical residential dweller to be supported only by the wheels and the handle on the upper part of the container, and thereafter rolled to an appropriate location, say curbside, for pickup by a recycler. Preferably, the container of this invention includes lifting means which make it possible for either a fully automatic or semi-automatic collection truck to lift and invert the container to dump the pile into the collection truck. The container is then returned to the curbside position for reuse.

In one form of the invention, the transparent retainer is a clear panel of glass or plastic, preferably coated with a scratch-resistant layer. Alternatively, the transparent retainer is made of netting, or is a plastic or metal grid, or anything else that permits a good view of the container contents. For example, in another embodiment, the container includes a front wall formed integrally with the two sides and bottom of the container, and which is provided with sufficient openings to permit the required inspection of the container contents for unacceptable contaminants.

In another form of the invention, the container floor slopes downwardly and away from the front of the container when the container base and wheels rest on a horizontal surface. This promotes formation of a stable pile which rests securely against the back of the container. In the preferred form, the bottom of the container is at an angle between about 2° and about 12° from horizontal when the container base rests on a horizontal support.

In yet another form of the invention, the back wall of the container slopes upwardly and away from the front of the container at an angle between about 2° and about 12° from vertical when the container base rests on a substantially horizontal support. This also promotes formation of a stable pile which rests firmly against the back of the container.

In a preferred form of the invention, the container bottom slopes downwardly and away from the front of the container, and the back slopes upwardly and away from the front of the container.

To facilitate tilting the container to rest only on the wheels, a step plate is mounted on the bottom of the container front to extend away from the container in a direction transverse to the axis of the rotation of the wheels, which can be mounted either at the front or the back of the container.

DETAILED DESCRIPTION OF THE INVENTION

Figure 1:
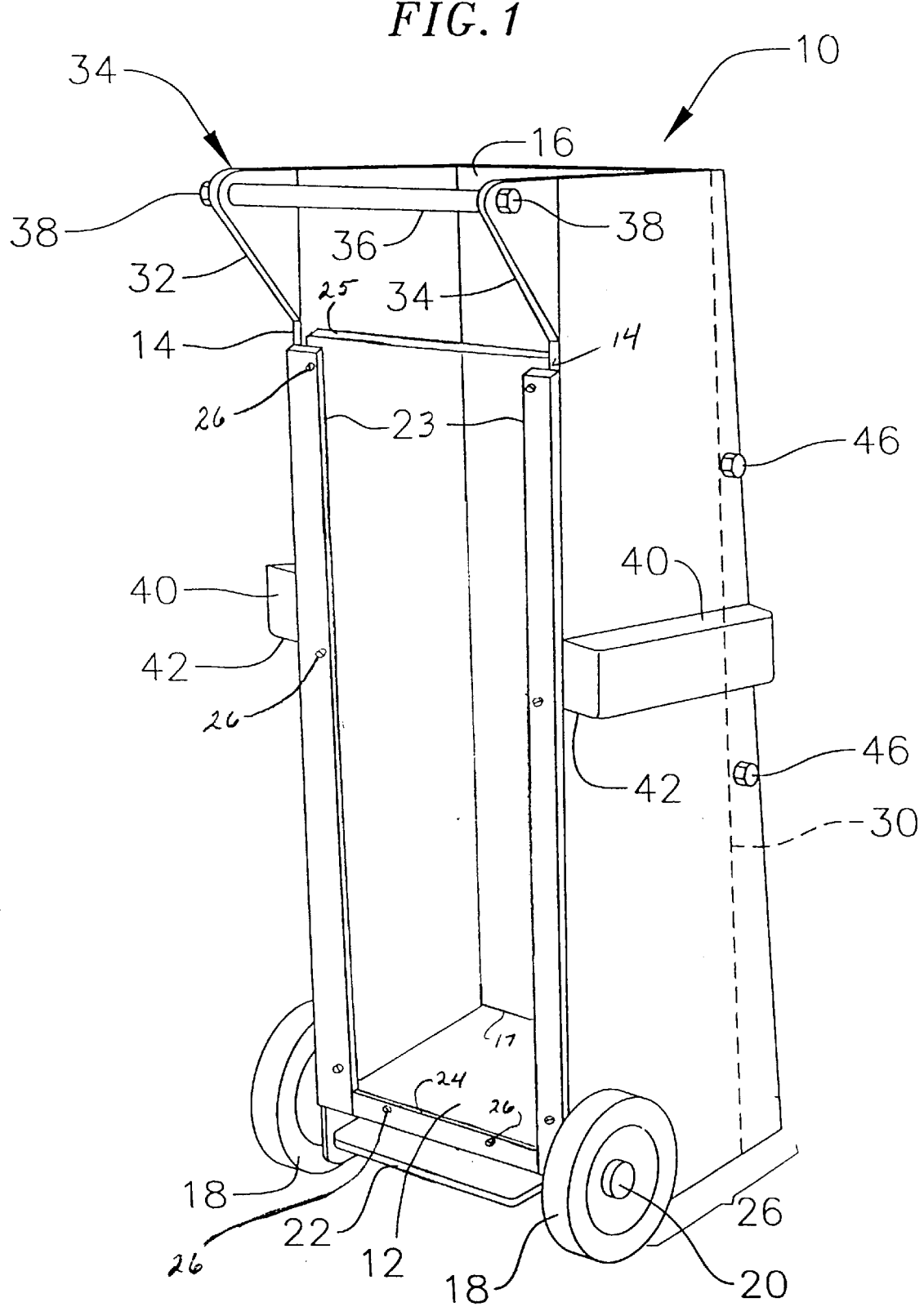
FIG. 1 is a perspective view of a container with wheels mounted at the front of the container.
Figure 2:
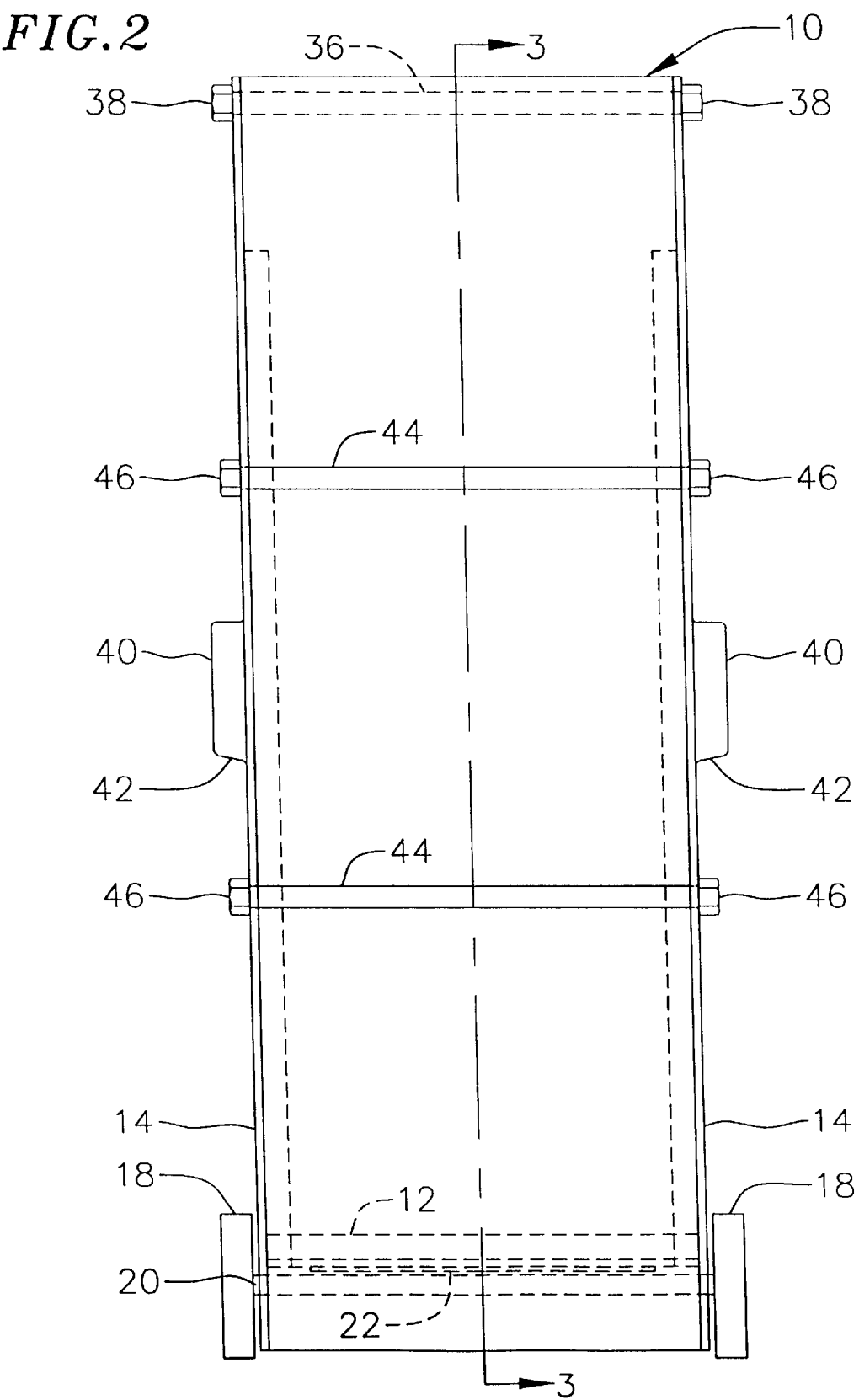
FIG. 2 is an elevational view of the back of the container shown in FIG. 1.
Figure 3:
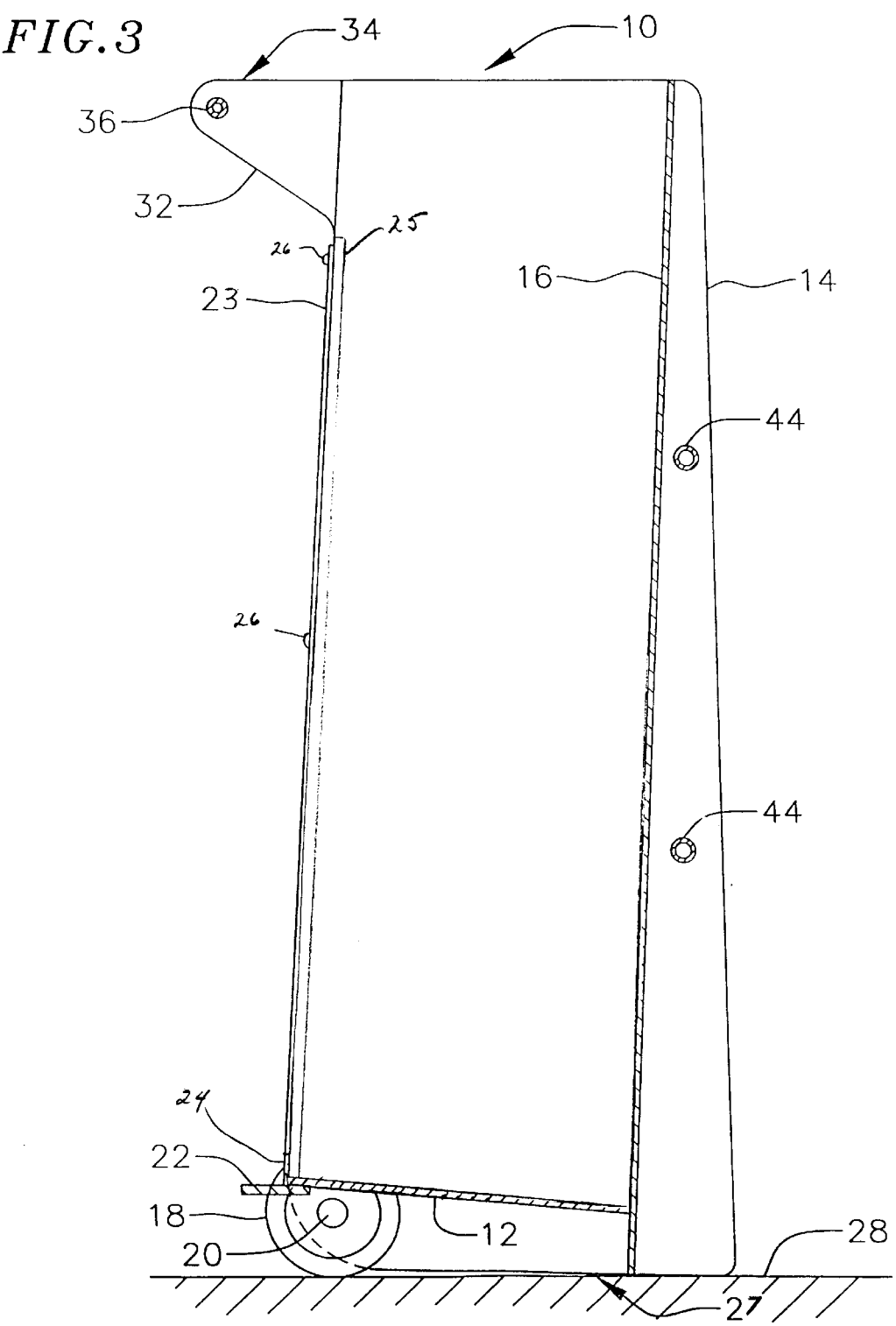
FIG. 3 is a view taken on line 3—3 of FIG. 2.

Referring to FIGS. 1, 2 and 3, a container 10 includes a bottom wall 12, identical upright and parallel side walls 14, and an upwardly extending back wall 16. The rear edge of the bottom wall is secured along a horizontal line 17 to a lower part of the back wall. Each side edge of the bottom wall is each secured to a lower portion of a respective side wall.

A pair of rotatable wheels 18 are mounted on opposite ends of a horizontal axle 20 secured through the forward lower portions of the side walls 14 just below the container bottom 12, and just to the rear of the forward edge of the bottom wall. A substantially horizontal step plate 22 is secured to the underside of the front edge of the bottom wall to provide a step to facilitate tilting the container as described below. The step plate is almost the same width as the bottom wall, and extends three to five inches forward of the front edge of the bottom wall.

As shown in FIG. 1, a separate upright and elongated side lip 23 is secured to the forward edge of each side plate 14 and bottom plate 12 to extend almost to the top of the container. The side lips also extend inwardly a relatively short distance toward each other so the front of the container is still left substantially open. An upwardly extending bottom lip 24 is secured to the forward edge of the container bottom to project a short distance above the bottom so as to leave the front of the container substantially open. A transparent retainer 25 is secured by screws 26 to the inside faces of the lips to extend across substantially all the open front of the container and confine a pile (not shown) of recyclable articles in the container. The horizontal distance between the inner edges of the side lips is substantially greater than the horizontal width of the lips. This permits rapid visual inspection of the pile in the container for unacceptable contaminants. The transparent retainer can be secured in place by any suitable arrangement, such as glue or strips (not shown) of Velcro material (a hook and loop fabric) secured to the lips and outer edges of the retainer.

As shown in FIG. 3, each side wall 14 is in the shape of a trapezoid with parallel top and bottom edges, and which tapers outwardly from top to bottom. The lower edges of the side walls and the wheels 18 form a base 27 secured to the bottom wall, and adapted to rest on a flat horizontal supporting surface 28. The lower edge of the back wall 16, which is an elongated upwardly extending rectangle (FIG. 2), is coterminous with the lower edges of the side plates, and also forms part of the base 27 secured to the bottom wall. The back wall 16 extends upwardly away from the front of the container at a slight angle to vertical when the container base and wheels rest on the supporting surface 28 as shown in FIG. 3. The opposite edges of the back wall are each secured to the inner surfaces of the rear portion of a respective side wall. The bottom 12 of the container slopes slightly downwardly and away from the open face of the container when the container is at the rest position shown in FIG. 3. The angle at which the bottom slopes relative to horizontal when the container is in the rest position as shown in FIGS. 1–3 can be any suitable amount. Good results are obtained when the bottom slopes between about 2° and about 12° relative to horizontal with the container in the rest position shown in FIG. 3. The back wall preferably slopes from vertical at an angle between about 2° and about 12° when the container is at rest as shown in FIG. 3. Conveniently, the bottom wall 12 is substantially perpendicular to the back wall 16. In the preferred embodiment, both the bottom wall 12 and the back wall 16 slope slightly as shown in FIG. 3 because this facilitates easy formation of a stable pile of a large amount of recyclable material when the container is in the rest position shown in FIG. 3. However, the container can have a horizontal bottom wall with a sloping back wall, or a sloping bottom wall with a vertical back wall, or the bottom wall can be horizontal and the back wall vertical. In any event, the transparent retainer confines the pile in the container as it is tilted and rolled from one location to another as described below.

The transparent retainer 25 can be made of any suitable material, and can be either completely solid or foraminiferous, or a combination of those two properties. For example, the transparent retainer can be a solid panel of transparent glass or plastic, preferably coated with a scratch-resistant layer. It can also be fabric or plastic netting, or plastic or metal grid, or anything else which allows a good view of the container contents, and confines the pile in the container.

The phantom line 30 shown in FIG. 1 indicates the line along which one side edge of the back wall is secured to the inner face of a side wall.

As shown in FIGS. 1 and 3, a separate triangle-shaped plate 32 is secured to the forward edge of the upper end of each side plate 14 to provide outwardly extending parallel brackets 34. An elongated horizontal tubular handle 36 extends through the upper and outer ends of the brackets, and is secured to them by a respective nut 38 threaded onto each end of the handle. As shown in FIG. 3, the brackets 34 support the handle at a substantial distance, say three to eight inches in front of the forward edges of the side walls, to facilitate tilting and dumping the pile when the container is inverted as described below.

Separate outwardly extending and horizontal lifting bars 40 secured to the exterior and midpoint of each side wall provide horizontal and downwardly facing shoulders 42 to receive fully automated lifting arms (not shown) used by some refuse trucks to pick up and invert conventional trash containers. Each lifting bar extends from the front to the rear edge of its respective side wall.

A pair of horizontal and vertically spaced tubular lifting rods 44 extend through the rear portions of the side walls 14 to the rear of the back wall 16, and are secured in place by nuts 46 threaded on the respective ends of the lifting rods. The vertical space between the lifting rods is set to receive semi-automated lifting forks (not shown) employed by some refuse trucks to pick up, invert, and dump contents from conventional containers.

The container shown in FIGS. 1–3 is used by placing recyclable material in the container to form a pile (not shown). The relatively wide open top of the container makes it easy to load recyclable material into the container, and the sloping bottom and back walls of the container promote the formation of a stable pile which slopes slightly away from the front of the container, and which rests securely against the back wall.

Once the container is suitably filled with uncontaminated recyclable material, say to a height of 4 to 6 feet, it holds a sufficient load to make it profitable for collection and recycling. Moreover, the container with the load is easily moved to a pickup point, say at the curbside of a residence served by a collection service, by placing one foot on the step plate 22, and pulling the handle 36 to lift the rear (base) of the container out of contact with the supporting surface. Thereafter, the container is rolled to the desired pickup point, where it can be picked up either fully- or semi-automatically and inverted over a collection truck to dump the stack from the container. The high position of the handle facilitates tilting the container, and the location of the handle 36 away from the container opening facilitates dumping.

The transparent retainer across the open front of the container confines the pile in the container, and makes it easy for the collector to inspect the entire pile quickly for contamination with unacceptable refuse. If it is contaminated, the collector can decline to accept the pile. This encourages the user of the container to ensure that the pile is not contaminated. Moreover, the relatively large pile in the container provides an economical load of recyclable material for the collector, thus encouraging recycling.

The container can be constructed of metal parts, which can easily be welded together. Preferably, it is molded integrally from any suitable plastic.

The container can have any suitable dimensions. For example, the back wall can be 40 to 60 inches high, and between about 14 and about 18 inches wide. The side walls are about the same height as the back wall, and are between 12 and 18 inches from front to back. The bottom wall is of appropriate size to accommodate the side and back walls. The horizontal spacing between the side lips at the front of the container should be the maximum possible to facilitate complete and rapid visual inspection of material in the container. The horizontal width of the side lips and height of the bottom lip can be between about 2 inches and about 3½ inches. The wheels can be of any suitable size. Larger wheels make the container easier to tilt and handle, but require more space. Wheels with diameters between about 3 inches and about 10 inches are satisfactory for most purposes.

Figure 4:
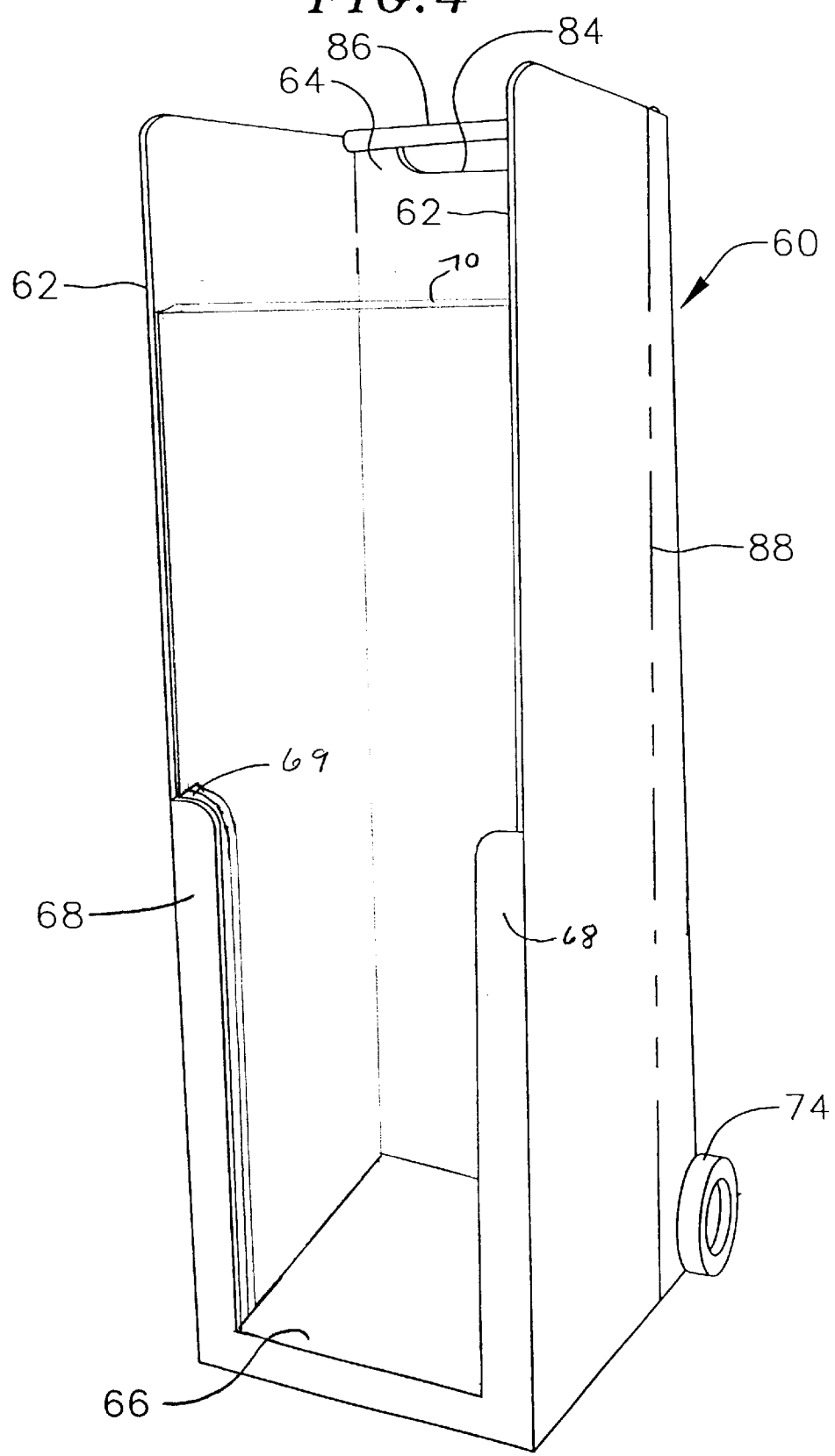
FIG. 4 is a perspective view of a container with wheels mounted at the back of the container.
Figure 5:
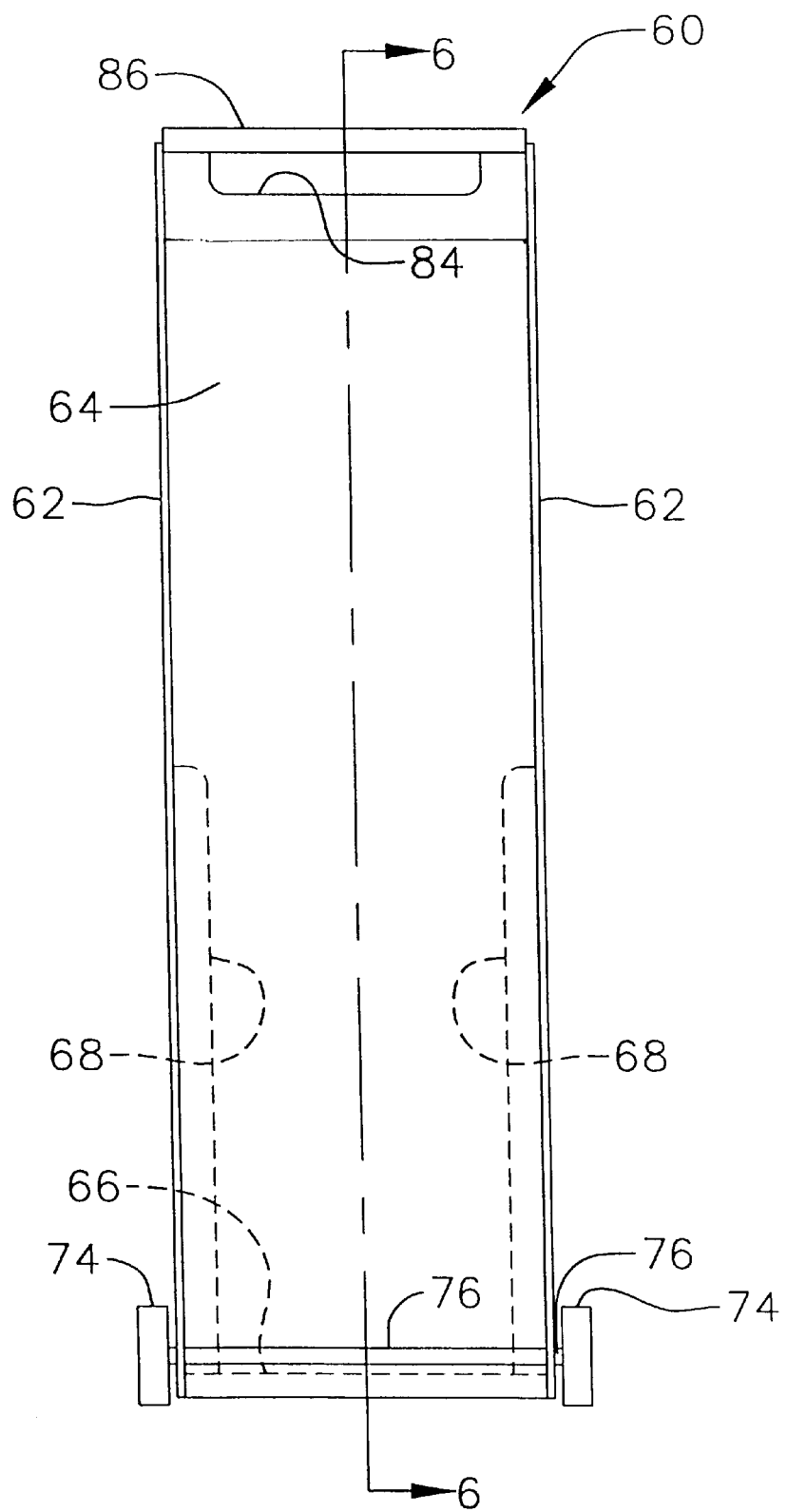
FIG. 5 is a view of the back of the container shown in FIG. 4.
Figure 6:
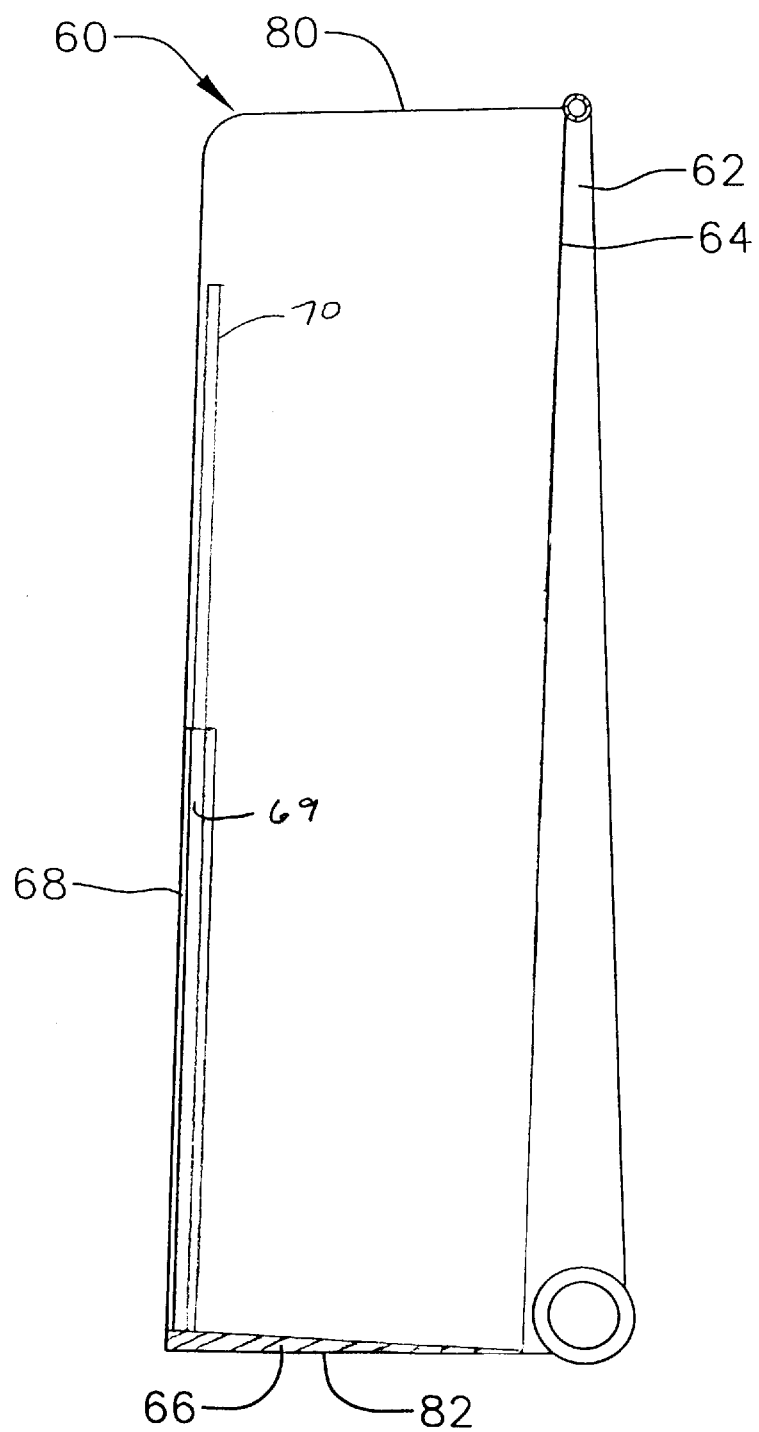
FIG. 6 is a view taken on line 6—6 of FIG. 5.

FIGS. 4, 5 and 6 show an alternate embodiment of the invention. A container 60 includes a pair of vertical identical side walls 62 and an upwardly extending back wall 64 secured at opposite edges to rear portions of the side walls. A bottom wall 66 is secured at opposite edges to the lower edges of the side walls, and at its rear edge to a lower part of the back wall.

A separate inwardly extending side lip 68 is secured to the lower portion of the front edge of each side wall. Each lip extends upwardly from the bottom wall to about the mid-point of the side walls, and has a separate respective inwardly opening groove 69, which extends for the length of the respective lip. A rectangular transparent panel 70 makes a snug fit in the grooves, and extends from the bottom wall to near the top of the container. An adhesive (not shown) bonds the panel in the grooves. Alternatively, the panel is unbounded, relying on static friction to keep the panel in place when the container is inverted. In another form, a releasable retainer (not shown) on the container engages the upper edge of the panel to keep it in place when the container is inverted. With either of these latter two arrangements, the panel is easily replaced when necessary, or removed entirely so the container can be used to collect newspapers, and the like, as disclosed in my U.S. Pat. No. 6,293,568.

As with the embodiment of FIGS. 1–3, the horizontal distance between the inner edges of the lips 68 is substantially less than the width of the stack. Preferably, the horizontal distance between the inner edges of the lips is between about 70% and about 95% of that between the inner faces of the side walls.

A pair of rotatable wheels 74 are mounted on opposite ends of a horizontal axle 76 journaled through the lower rear portions of the side walls 62, which each are of a trapezoidal shape with parallel top and bottom edges 80 and 82, respectively. As shown best in FIG. 6, the lower edge of each side plate is slightly longer than the upper edge. The back wall 64 extends at a slight angle upwardly and away from the front of the container. Phantom line 88 shows the position of one edge of the back wall against a side wall of the container. The bottom wall extends downwardly and away from the front of the container so the bottom and back walls are mutually perpendicular. An upwardly opening notch 84 in the upper edge of the central portion of the back wall facilitates gripping a horizontal handle 86, which is welded to the upper edge of the back wall across the notch 84.

The container of FIGS. 4–6 is used in a manner similar to that for the container FIGS. 1–3. After recyclable material is piled to a suitable height, the container is tilted by placing one foot on the axle 76, and pulling the handle 86 to lift the forward edge of the container so it is supported only by the wheels. The container is then rolled to a desired location for pickup and dumping.

In an alternate embodiment, the wheels need not be mounted on the container. Instead, the wheels can be on a separate dolly with a platform which fits under the container. With such an arrangement, the dolly platform is preferably placed under the container before it is fully loaded.

One advantage of the embodiment shown in FIGS. 4–6 is that the side lips are relatively short, leaving much of the front of the container completely unobstructed for visual inspection of the pile in the containers. Of course, the lips can be omitted, and the panel can be secured to the front edges of the side wall, say with adhesive, or any other suitable fastener.

An advantage of the embodiment shown in FIGS. 1–3 is that it is easily stored with the back wall against the wall of a room, garage, or the like, leaving the open front of the container easily accessible for inspecting the load in the container. However, in either embodiment, the container provides an easy way to accumulate a relatively large amount of recyclable material which can be quickly inspected for contamination. This promotes cost-efficient recycling.

FIGS. 7–12 show a container 90 integrally molded of plastic, which can be of any suitable type, such as low linear density polyethylene. The container includes a pair of upright and substantially parallel side walls 92. Each side wall has a respective bottom edge 93, forward edge 94, and a rear edge 95. An upright back wall 96, disposed to be substantially perpendicular to and between the side walls, has a bottom edge 97 (FIGS. 8 and 9), a first side edge 98 formed integrally with the rear edge 95 of one side wall, and a second side edge 100 formed integrally with the rear edge 95 of the other side wall (see FIG. 7).

To facilitate nesting (as described below) of one container in another (not shown) before the wheels are mounted, the side and back walls slope slightly upwardly and away from each other so the upper end of the container is slightly larger than the lower end. The walls can slope at any suitable angle, say between 1° and 5° from vertical.

A separate inwardly extending and substantially horizontal web 102 is formed integrally with each of the bottom edges of the side and back walls. A substantially horizontal floor 104 (FIG. 8) has a rear edge 105 formed integrally with an upper edge 106 of an upright flange 108 formed integrally along a lower edge 109 with an inner edge 110 of flange 102 at the bottom edge of the back wall 96. Each side edge 112 (FIG. 10) of the floor is formed integrally with a respective upper edge 114 of an upright flange 116 having a lower edge 118 formed integrally with a respective inner edge 120 of a web 102 on the bottom edge of each side wall.

A separate upright and inwardly extending retainer lip 122 (FIGS. 7 and 10) is formed integrally with the forward edge 124 of each side wall. The inner edges of the retaining lips are substantially parallel, and the horizontal width of each lip is substantially less than the horizontal distance between the side walls so the front of the container is substantially open to permit rapid visual inspection of a pile (not shown) of recyclable material in the container. Preferably, the horizontal distance between the inner edges of the retaining lips is at least half the horizontal distance between the two side walls.

Figure 7:
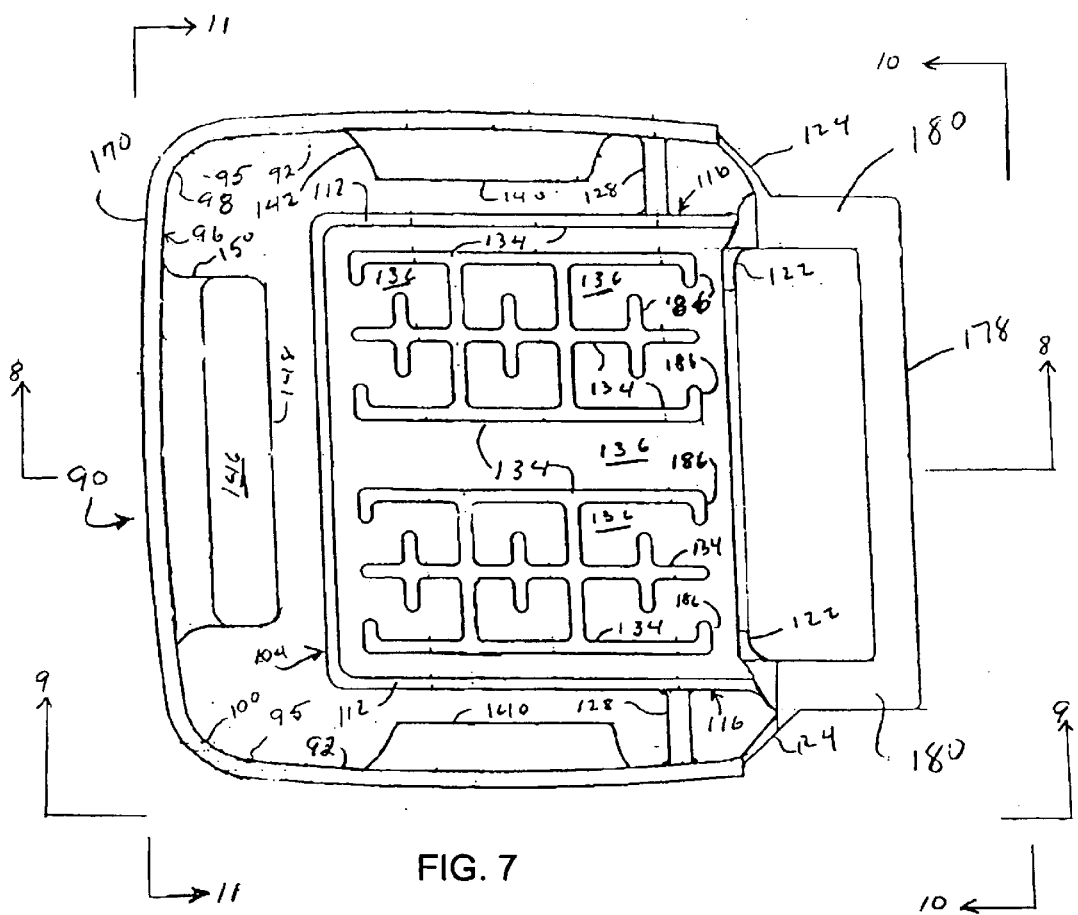
FIG. 7 is a top view of the front of a container integrally molded from plastic.
Figure 8:
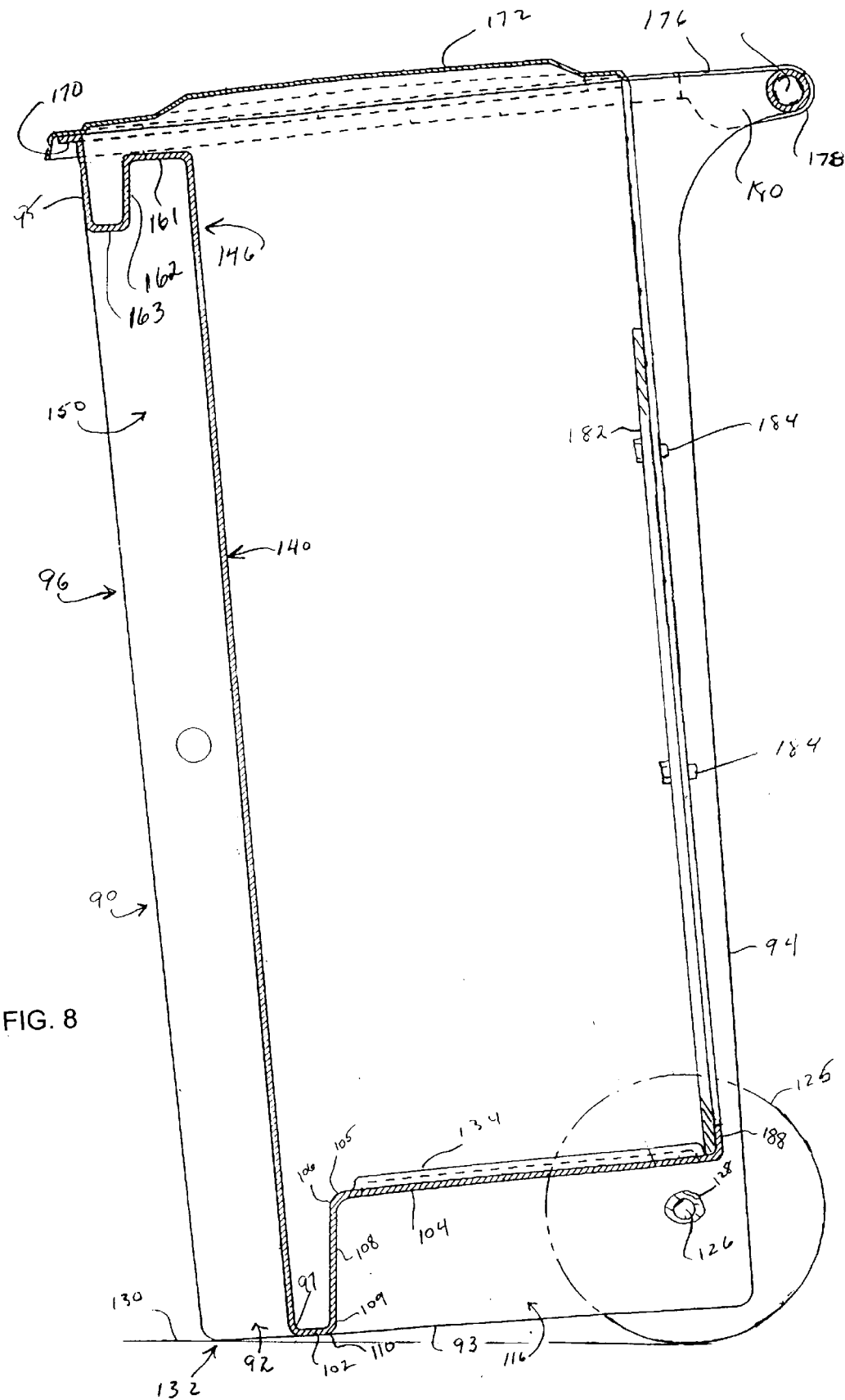
FIG. 8 is a sectional view taken on line 8—8 of FIG. 7.
Figure 9:
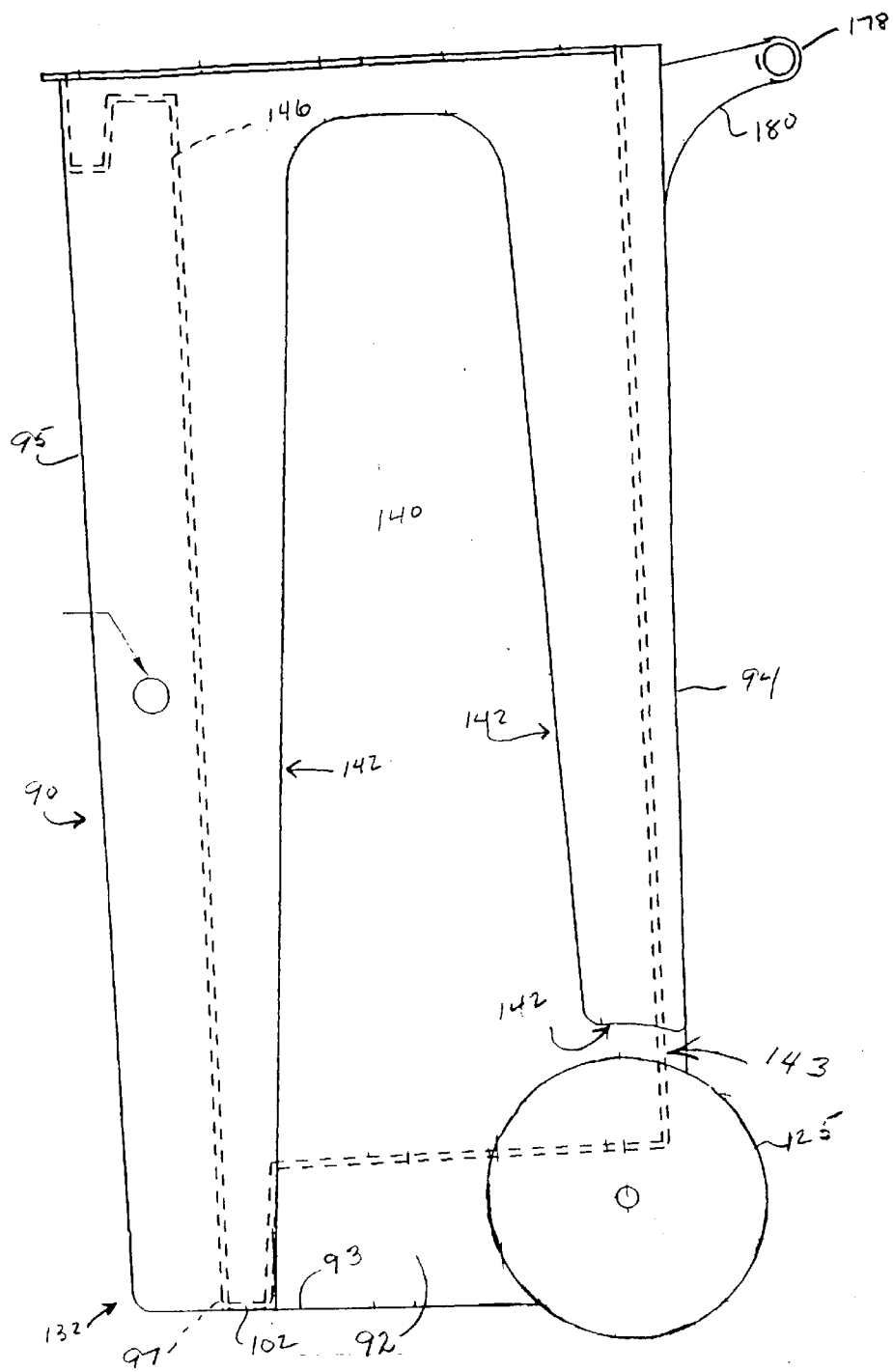
FIG. 9 is a side elevation of the container taken on line 9 and 9 of FIG. 7.
Figure 10:
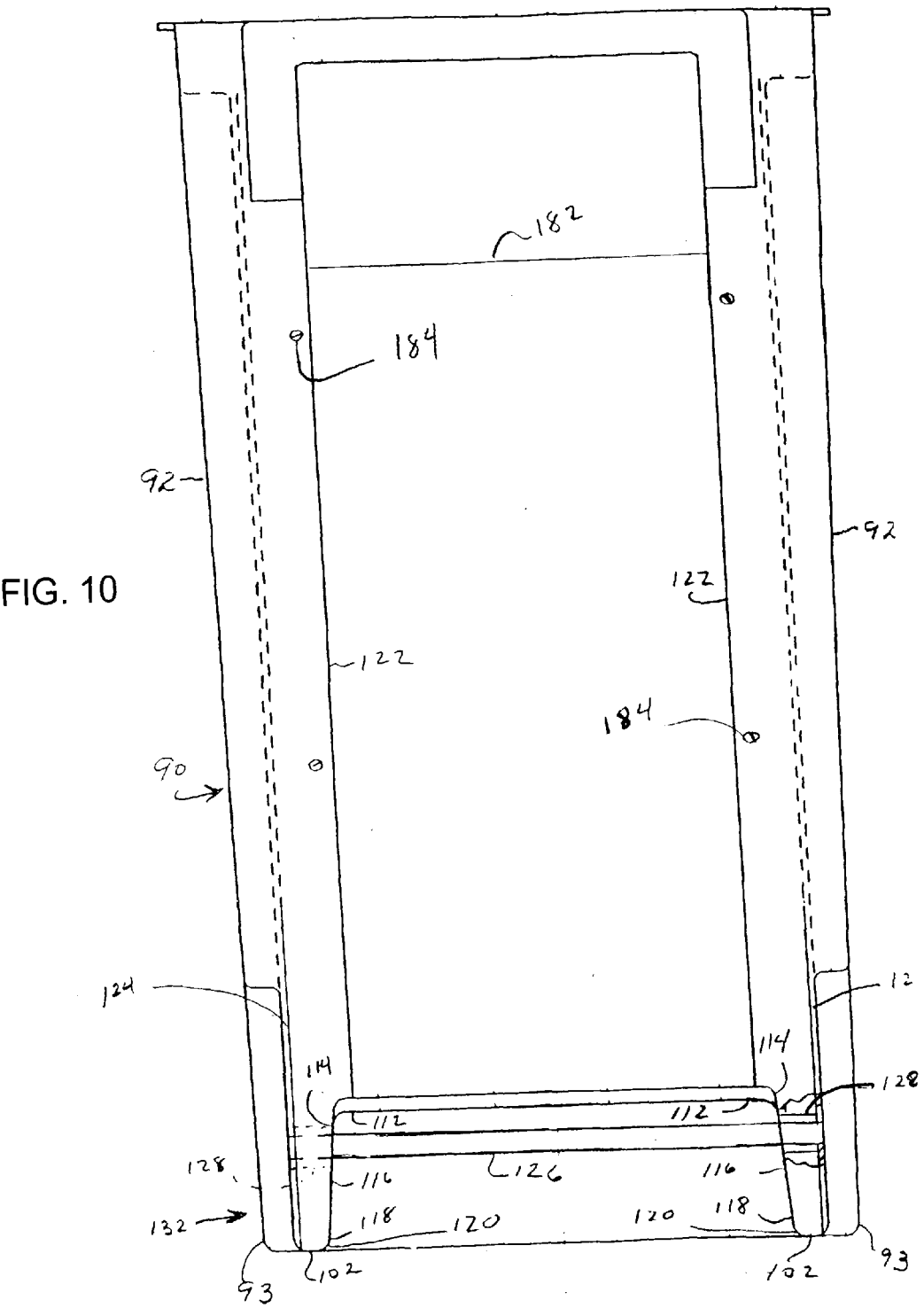
FIG. 10 is a front elevational view of the container taken on line 10—10 of FIG. 7.
Figure 11:
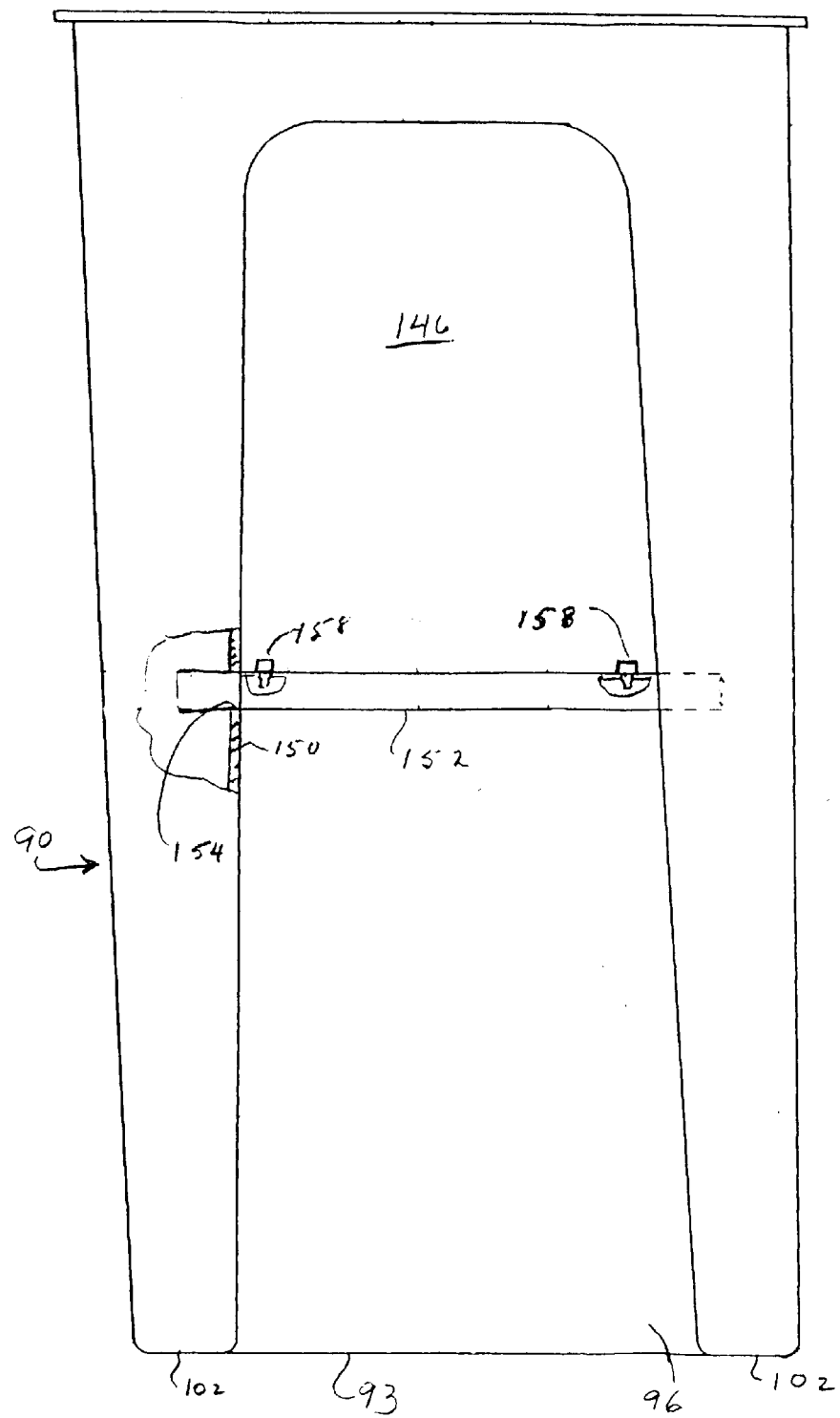
FIG. 11 is a rear elevational view of the container taken on line 11—11 of FIG. 7.

As shown only in FIGS. 8 and 9, a pair of wheels 125 are mounted on opposite sides of the container on an axle 126 (partly shown in FIG. 10) journaled through bearing sleeves 128 (FIGS. 7, 8 and 10) molded integrally with the opposing faces of the forward and lower part of each side wall and the corresponding flange 116 connected to that side wall by web 102.

As shown in FIGS. 8 and 9, the rear part of the lower edge 93 of each side wall extends below and to the rear of the container floor, and the forward part of each side wall extends below the container floor. The axle 126 is below and slightly to the rear of the forward edge of the container floor. Thus, when the container rests on a horizontal support surface 130, the rear part of the lower edges of the side walls and webs 102 and flanges 116 form a base 132 which rests on the support along with the wheels. With the container in the rest position shown in FIGS. 8 and 9, the container floor preferably slopes downwardly toward the rear of the container to facilitate forming a stable stack of recyclable material in the container.

As shown in FIGS. 7 and 8, the floor of the container is formed with laterally spaced elongated ridges 134 and adjacent flat planar sections 136 to form a waffle-type pattern that adds strength and rigidity to the floor.

As shown in FIGS. 7 and 9, each side wall includes a centrally located and inwardly displaced side panel 140 which extends from adjacent the upper edge of each side wall to the lower edge of each side wall. Each side panel 140 is formed integrally with a downwardly opening and generally U-shaped peripheral flange 142, which is formed integrally with the adjacent part of the side wall. As shown best in FIG. 9, the lower forward end of each flange 142 extends forwardly to the forward edge of the side wall to form a well 143 to accommodate the upper periphery of a respective wheel 125.

The side panel 140 widens slightly from top to bottom to facilitate nesting of one container in another before wheels are mounted on the container. Thus, the sides of the side panel 140 taper slightly outwardly and downwardly so the peripheral flange 142 forms a downwardly opening and outwardly facing groove on the exterior of each respective side wall to receive a side panel 140 of another container (not shown) when the two containers are nested together. Thus, several containers without wheels can be nested together to form a compact stack for economical shipping and later assembly with the wheels.

As shown best in FIGS. 7, 8, 9, and 11, the back wall 92 includes a centrally located inwardly displaced back panel 146 in the form of an elongated rectangle extends from adjacent the upper edge of the back wall to the lower edge of the back wall. A transverse peripheral back flange 150 formed integrally with the central panel 146 and the adjacent portion of the back wall provides additional stiffness to the container structure. The back flange 150 forms a downwardly opening and outwardly facing groove which is tapered downwardly and outwardly so it can receive the upper part of a back panel 146 of another container (not shown) to permit the two containers to be nested without wheels for shipping as referred to above.

After the containers without wheels or axles are nested, shipped, and removed from the nested position, the axle and wheels are assembled on each container. A horizontal cylindrical lifting bar 152 (FIG. 11) is also mounted on the back of the container. The bar extends through collinear bores 154 in the back flanges 150. The length of the lifting bar is less than the distance between the inner surface of a side wall and the opposite flange 150 of the other side wall so that the bar can be slipped into one of the openings 154 until it almost engages the interior surface of the adjacent side wall. The lifting bar is aligned with the opposing opening 154, and inserted into it. A pair of stop screws 158, or other suitable stop devices are then secured in openings 159 adjacent a respective inwardly facing part of back flange 150 so the bar can not be slipped out of the bores 154. The container can now be picked up, inverted, and dumped by automatic lifters found on many commercial refuse collection vehicles.

As shown in FIG. 8, an upper, or horizontal, part 161 of back flange 150 is formed integrally at its outer (rear) edge with the upper edge of a substantially vertical back web 162, which is formed integrally at its lower edge with a substantially horizontal strip 163, the outer edge of which is formed integrally with the adjacent part of the back wall. This provides additional strength and rigidity to the upper end of the container.

An outwardly extending horizontal flange 170 is formed integrally with the upper edges of the back and side walls to add additional stiffness and strength to the upper edges of the container.

Figure 12:
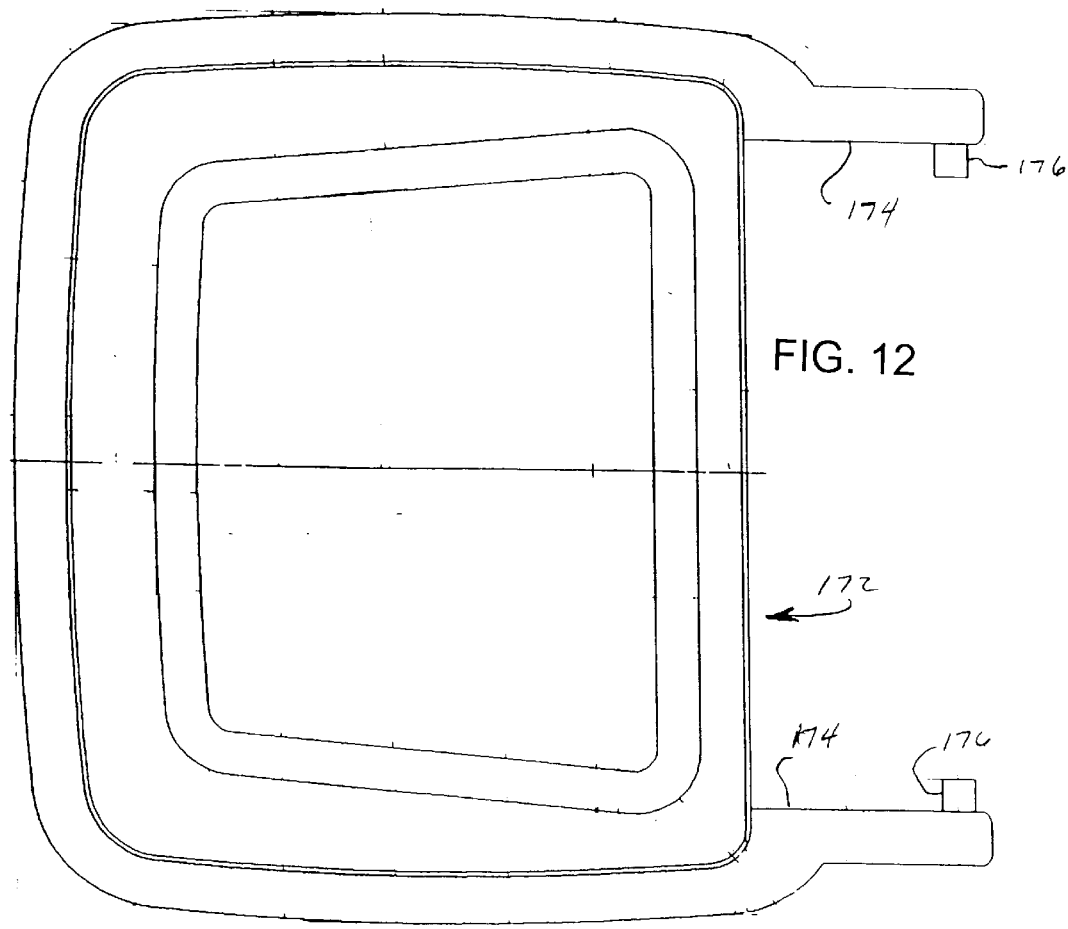
FIG. 12 is a top view of a lid for the container.
Figure 13:
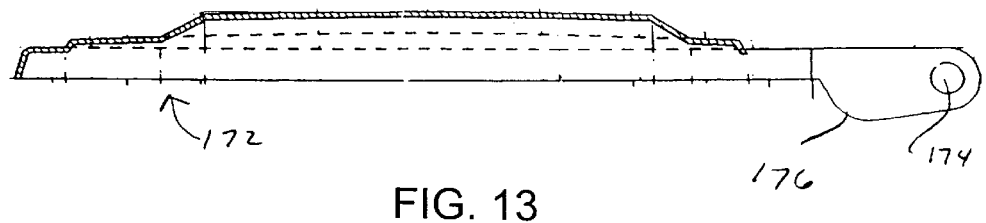
FIG. 13 is a view taken on line 13—13 of FIG. 12.

If desired, the container includes a substantially flat lid 172 (FIGS. 8, 12 and 13). A pair of laterally spaced, and forwardly extending, lid brackets 174 are integrally molded with the forward edge of the lid. A separate inwardly extending boss 176 on the forward end of each lid bracket makes a snug fit in a respective end of a hollow cylindrical handle 178 formed integrally with laterally spaced and forwardly extending handle brackets 180, which are integrally molded at their rear ends with the forward and upper portions of the side walls. Thus, the handle brackets and handle provide additional rigidity to the upper end of the open side of the container. As shown in FIG. 9, the upper surface rear end of each handle bracket is disposed below the upper edges of the side walls and retaining lip so water does not drain from the top surface of the handle brackets into the container.

The container shown in FIGS. 7–11 can be used to store a stack of newspapers as described in our U.S. Pat. No. 6,293,568, or it can be modified to include a transparent retainer 182 (FIG. 10) secured with screws 184 to the retainer lips 122, as described above with respect to the invention shown in FIGS. 1–6. As shown best in FIG. 7, the forward ends of ridges 134 formed in the container floor include segments 186, which extend substantially perpendicular to the container sidewalls, and are located adjacent and just to the rear of an upwardly extending sill 188 having a lower edge formed integrally with the container floor, and having side edges formed integrally with the lower portion of a respective sidewall. Thus, the segments 186 and the seal 188 form a groove which receives the lower edge of the transparent panel 182. This secures the lower portion of the panel firmly in place without requiring screws, or other fastening devices, and facilitates installation of the panel in the position shown in FIGS. 7 and 8.

We claim:

1. A container for storing and transporting a pile of recyclable material, the container comprising a bottom, a front, a back, and two sides:
    a base secured to the bottom of the container, the base being adapted to rest on a substantially horizontal support;
    a bottom wall secured to the base;
    a pair of upright side walls spaced from each other and secured to the bottom wall;
    an upwardly extending back wall disposed between the side walls, the front of the container being substantially open to facilitate inspection of the stack for contaminants;
    a transparent retainer across the front of the container to confine the pile within the container; and
    wheels mounted on the bottom of the container so the wheels and part of the base rest on the support so the container can be tilted to move the base out of contact with the support, and can be rolled on the wheels to transport the pile of recyclable material in the container.

2. A container for storing and transporting a pile of recyclable material, the container comprising a bottom, a front, a back, and two sides:
    a base secured to the bottom of the container, the base being adapted to rest on a substantially horizontal support;
    a bottom wall secured to the base;
    a pair of upright side walls spaced from each other and secured to bottom wall;
    a back wall disposed between the side walls to extend upwardly and away from the front of the container to form a support for the pile inclined at an angle to vertical when the base of the container rests on the horizontal support, the front of the container being substantially open to facilitate inspection of the pile for contaminants;
    a transparent retainer across the front of the container to confine the pile within the container; and
    wheels mounted on the bottom of the container so the wheels and part of the base rest on the support so the container can be tilted to move the base out of contact with the support, and can be rolled on the wheels to transport the pile in the container.

3. A container for storing a pile of recyclable material the container comprising a bottom, a front, a back and two sides:
    a base secured to the bottom of the container, the base being adapted to rest on a substantially horizontal support;
    a bottom wall secured to the base to slope downwardly from the front to the back of the container when the base of the container rests on the horizontal support;
    a pair of upright side walls spaced from each other and secured to the bottom wall;
    an upwardly extending back wall disposed between the side walls, the front of the container being substantially open to facilitate inspection of the pile for contaminants;
    a transparent retainer across the front of the container to confine the pile within the container; and
    wheels mounted on the bottom of the container so the wheels and part of the base rest on the support so the container can be tilted to move the base out of contact with the support, and can be rolled on the wheels to transport the pile in the container.

4. A container according to claim 3, in which the back wall extends upwardly and away from the front of the container to form a support for the pile inclined at an angle to the vertical when the base of the container rests on the horizontal support.

5. A container according to claim 2 or 4 in which the back wall slopes at an angle to vertical between about 2° and about 12°.

6. A container according to claim 3 or 4 in which the bottom wall slopes at an angle to horizontal between about 2° and about 12°.

7. A container according to claim 1, 2, 3 or 4 in which the wheels rotate about an axis nearer to the open front of the container than to the back wall.

8. A container according to claim 1, 2, 3 or 4 in which the wheels rotate about an axis nearer to the back wall of the container than to the front of the container.

9. A container according to claim 1, 2, 3 or 4 which includes lifting means on the exterior of the container to facilitate automatic pickup, inverting and dumping the pile from the container.

10. A container according to claim 1, 2, 3 or 4 which includes a handle secured to an upper portion of the container and disposed forwardly away from the container to facilitate dumping the pile when the container is inverted.

11. A container according to claim 10 in which the wheels rotate about an axis nearer the front of the container than the back.

12. A container according to claim 1, 2, 3 or 4 in which the retainer is removably secured to the container.

13. A container according to claim 12 in which the retainer is a panel made of a material selected from the group consisting of plastic and glass.

14. A container for storing and transporting a pile of recyclable material, the container comprising a bottom, a front, a back, and two sides:
- a base secured to the bottom of the container, the base being adapted to rest on a substantially horizontal support;
- a bottom wall secured to the base;
- a pair of upright side walls spaced from each other and secured to the bottom wall;
- an upwardly extending back wall disposed between the side walls, the front of the container being substantially open to facilitate inspection of the stack for contaminants;
- a transparent retainer across the front of the container to confine the pile within the container; and
- wheels mounted on the bottom of the container to rotate about a substantially horizontal axis adjacent the front of the container so the wheels and part of the base rest on the support so the container can be tilted to move the base out of contact with the support, and can be rolled on the wheels to transport the pile of recyclable material in the container.

15. A container according to claim 14 which includes a handle secured to an upper part of the front of the container to facilitate tilting the loaded container.

16. A container according to claim 14 or 15 in which the axis is located to the rear of the forward edges of the bottom of the container.

17. A container for storing and transporting a pile of recyclable material, the container comprising a bottom, a front, a back, and two sides:
- a base secured to the bottom of the container, the base being adapted to rest on a substantially horizontal support;
- a bottom wall secured to the base;
- a pair of upright side walls spaced from each other and secured to the bottom wall;
- an upwardly extending back wall disposed between the side walls, the front of the container being substantially open to facilitate inspection of the stack for contaminants;
- a transparent retainer across the front of the container to confine the pile within the container; and
- wheels mounted on the bottom of the container to rotate about a substantially horizontal axis adjacent the back of the container so the wheels and part of the base rest on the support so the container can be tilted to move the base out of contact with the support, and can be rolled on the wheels to transport the pile of recyclable material in the container.

18. A container according to claim 17 which includes a handle secured to an upper part of the back of the container to facilitate tilting the container.

19. A container according to claim 17 or 18 in which the back of the container slopes upwardly away from the front of the container.

20. A container for storing and moving a pile of recyclable material, the container being integrally molded from plastic, and comprising:
- a pair of upright substantially parallel side walls, each side wall having a bottom edge, a forward edge, and a rear edge;
- an upright back wall substantially perpendicular to the side walls, and having a bottom edge, a first side edge formed integrally with the rear edge of one side wall, and a second side edge formed integrally with the rear edge of the other side wall;
- a separate inwardly extending substantially horizontal web formed integrally with each bottom edge of the side and back walls;
- a separate upwardly extending flange formed integrally with the inner edge of each web;
- a substantially horizontal floor having a rear edge formed integrally with an upper edge of the flange on the web of the rear wall, and having a pair of side edges each formed integrally with a respective upper edge of a side wall flange on a web of a side wall;
- a separate and inwardly extending retaining lip formed integrally at an outer edge with the forward edge of each side wall, the horizontal width of each lip being substantially less than the horizontal distance between the side walls so the front of the container is substantially open to permit rapid visual inspection of the pile of recyclable material in the container; and
- pair of wheels secured to the lower portions of the side walls to be rotatable about a substantially horizontal axis so when the wheels rest on a horizontal support the lower portion of the side walls and the webs of the side walls serve as a base which rests on the support so the container can be tilted to lift the container out of contact with the support and rolled on the wheels to move the container.

21. A container according to claim 20 in which the floor includes laterally spaced elongated ridges.

22. A container according to claim 21 in which the side walls include integrally formed and inwardly disposed panels which form downwardly opening external grooves on the container side walls to facilitate nesting one container in another.

23. A container according to claim 20 or 22 in which the back wall includes an inwardly disposed panel formed integrally with the back wall to provide a downwardly opening groove exterior of the back wall to facilitate nesting one container in another.

24. A container according to claim 20 or 21 which includes a transparent retainer secured over the open front of the container.

25. A container according to claim 24 which includes an upwardly opening groove in the front edge of the container floor to receive the lower edge of the transparent retainer.

* * * * *